United States Patent [19]

Noda et al.

[11] Patent Number: 5,290,873
[45] Date of Patent: Mar. 1, 1994

[54] ISOBUTYLENE POLYMER HAVING UNSATURATED GROUP AND PREPARATION THEREOF

[75] Inventors: Koji Noda; Hiroshi Fujisawa; Kazuya Yonezawa, all of Hyogo, Japan

[73] Assignee: Kanegafuchi Chemical Industry Co., Ltd., Japan

[21] Appl. No.: 685,066

[22] Filed: Apr. 15, 1991

[30] Foreign Application Priority Data

Apr. 16, 1990 [JP] Japan ................................. 2-101029
Nov. 29, 1990 [JP] Japan ................................. 2-336364

[51] Int. Cl.$^5$ .................. C08F 4/52; C08F 210/10; C08F 236/20
[52] U.S. Cl. ..................... 525/313; 525/244; 525/319; 525/918; 526/337; 526/348.6; 526/348.7
[58] Field of Search ............... 526/337, 348.6, 348.7; 525/244, 313, 319, 918

[56] References Cited

U.S. PATENT DOCUMENTS 3,997,417 12/1976 Marek et al. ................ 526/348.7
4,327,201 4/1982 Kennedy et al. ................ 526/131
4,524,188 6/1985 Kennedy et al. ................ 525/333
4,929,683 5/1990 Kennedy et al. ................ 525/268

*Primary Examiner*—Vasu S. Jagannathan
*Attorney, Agent, or Firm*—Wegner, Cantor, Mueller & Player

[57] ABSTRACT

An isobutylene polymer having an unsaturated group and comprising more than one unit per molecule on the average of the formula:

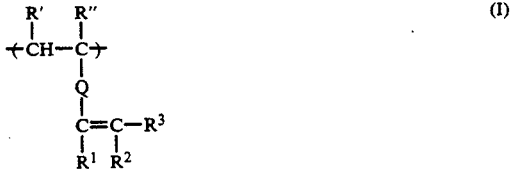

wherein $R^1$, $R^2$ and $R^3$ are the same or different and each a hydrogen atom or a $C_1$–$C_8$ alkyl group, $R'$ and $R''$ are the same or different and each a hydrogen atom, a methyl group or an ethyl group, and Q is a $C_1$–$C_{30}$ divalent organic group, which provides a cured material having improved weather resistance.

5 Claims, 4 Drawing Sheets

ISOBUTYLENE POLYMER HAVING UNSATURATED GROUP AND PREPARATION THEREOF

BACKGROUND OF THE INVENTION

1. Field of the Invention

The present invention relates to an isobutylene polymer having an unsaturated group and a process for preparing the same.

2. Description of the Related Art

An isobutylene polymer having more than one unsaturated group per molecule on the average is cross linked and cured to produce a rubbery cured material. Such polymer can be modified by introducing a cross-linkable silicon group to form a moisture-curable polymer as disclosed in U.S. Pat. No. 4,904,732 and Japanese Patent Kokai Publication No. 6041/1988.

The isobutylene polymer having more than one unsaturated group per molecule on the average is disclosed in U.S. Pat. Nos. 3,644,315 and 4,524,187 and it is prepared by copolymerizing isobutylene and a compound having a conjugated double bond, so that it has double bonds in polymer chains and is poor in weather resistance, chemical resistance and reactivity.

U.S. Pat. Nos. 4,316,973 and 4,758,631 and Japanese Patent Kokai Publication No. 105005/1988 disclose polymers having an unsaturated group at a chain end. The polymer of U.S. Pat. Nos. 4,316,973 and 4,758,631 is prepared by an Inifer method comprising cationically polymerizing isobutylene in the presence of 1,4-bis(α-chloroisopropyl)benzene as a polymerization initiating and chain transfer agent and BCl$_3$ as a catalyst and further reacting a formed polymer having a chlorine atom at a chain end.

A polymer disclosed in Japanese Patent Kokai Publication No. 105005/1988 is prepared by synthesizing an isobutylene polymer having chlorine atoms at both chain ends by the Inifer method and, just after synthesis or purification, reacting the isobutylene polymer with allyltrimethylsilane to obtain a polymer having allyl groups at both chain ends.

However, the polymers disclosed in U.S. Pat. No. 4,316,973 and Japanese Patent Kokai Publication No. 105005/1988 require multiple steps for the production and/or expensive raw materials.

SUMMARY OF THE INVENTION

One object of the present invention is to provide a novel isobutylene polymer having an unsaturated group.

Another object of the present invention is to provide a process for easily preparing such isobutylene polymer at a low cost.

According to a first aspect of the present invention, there is provided an isobutylene polymer having an unsaturated group and comprising more than one unit per molecule on the average of the formula:

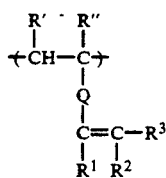

(I)

wherein $R^1$, $R^2$ and $R^3$ are the same or different and each a hydrogen atom or a $C_1$-$C_8$ alkyl group, $R'$ and $R''$ are the same or different and each a hydrogen atom, a methyl group or an ethyl group, and Q is a $C_1$-$C_{30}$ divalent organic group.

According to a second aspect of the present invention, there is provided a process for preparing an isobutylene polymer having an unsaturated group, which comprises polymerizing a cationically polymerizable monomer containing isobutylene and a non-conjugated diene in the presence of a Lewis acid.

According to a third aspect of the present invention, there is provided a process for preparing an isobutylene polymer having an unsaturated group, which comprises polymerizing a cationically polymerizable monomer containing isobutylene in the presence of a Lewis acid and reacting a resulting polymer with a non-conjugated diene.

DETAILED DESCRIPTION OF THE INVENTION

Figure 1:
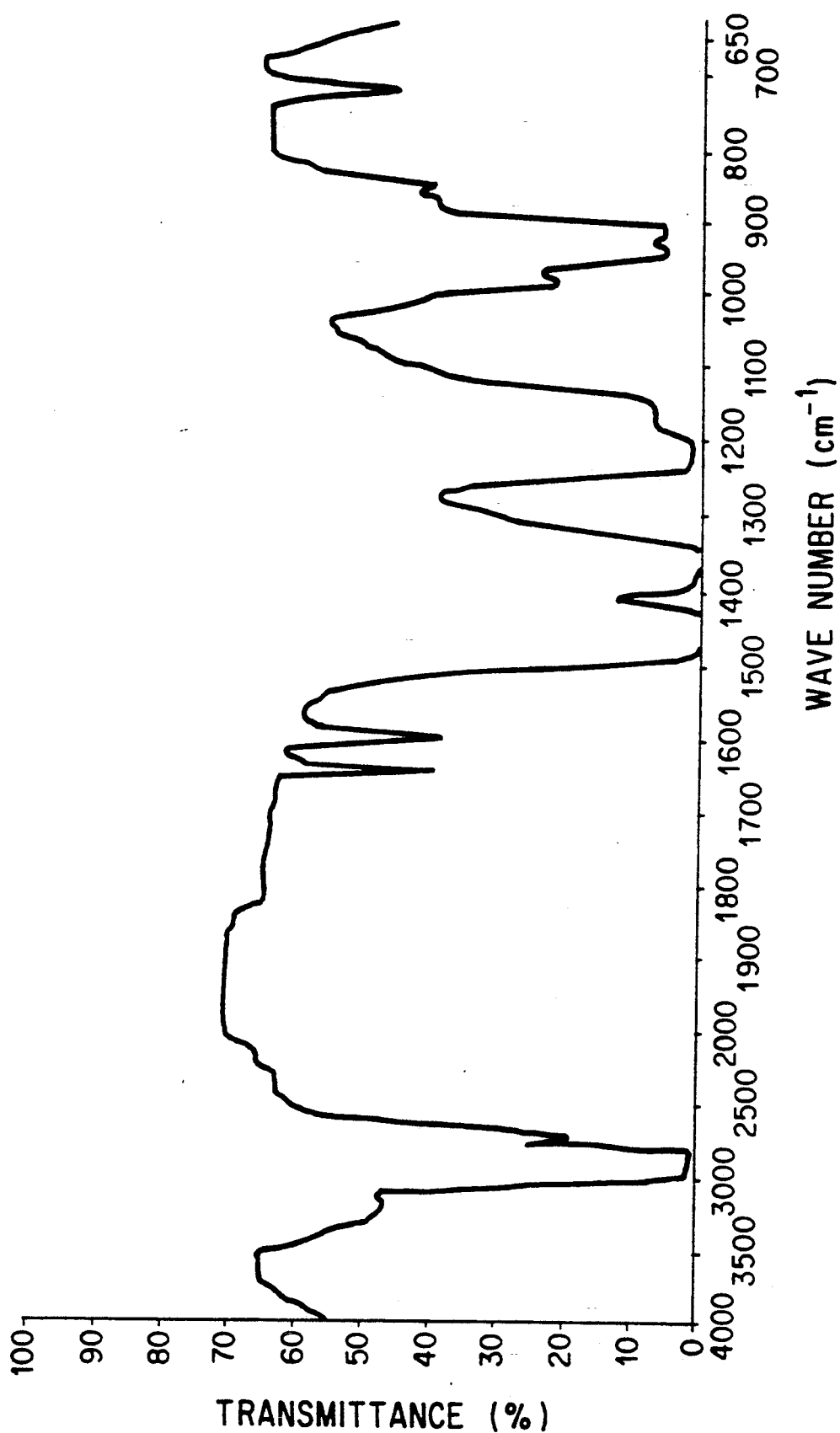
FIGS. 1 and 2 are the IR spectrum and the $^1$H-NMR spectrum of the polymer prepared in Example 1, respectively

In the formula (I), the $C_1$-$C_8$ alkyl group for $R^1$, $R^2$ and $R^3$ may be a straight or branched alkyl group and includes, for example, a methyl group, an ethyl group, a n-propyl group, an isopropyl group, a n-butyl group, a sec.butyl group, and the like. Among them, a methyl group is preferred. As $R^1$ to $R^3$, a hydrogen atom is most preferred.

As the groups $R'$ and $R''$ in the formula (I), a hydrogen atom is preferred.

The group Q may be a straight or branched divalent organic group and preferably a straight or branched alkylene group such as a hexene group.

The isobutylene polymer of the present invention is characterized in that it comprises the unit of the formula (I). The isobutylene polymer of the present invention usually has a number average molecular weight of from 500 to 500,000, preferably from 1000 to 50,000 and comprises more than one, preferably at least 1.05, more preferably at least 1.1, in particular at least 1.1 and not more than 5 units of the formula (I) on the average per molecule.

The unit of the formula (I) is preferably present at the end(s) of the polymer chain. Preferably, the isobutylene polymer of the present invention has no unsaturated group in the polymer chain in view of properties of the polymer such as weather resistance.

Typically, the isobutylene polymer of the present invention can be prepared by the following two processes.

Process 1

A cationically polymerizable monomer containing isobutylene and a non-conjugated diene are polymerized in the presence of a Lewis acid.

Process 2

A cationically polymerizable monomer containing isobutylene is polymerized in the presence of a Lewis acid and then a resulting polymer i reacted with a non-conjugated diene.

The "cationically polymerizable monomer" herein used is intended to include not only a pure isobutylene monomer but also a monomer mixture comprising 50% by weight or more of isobutylene and 50% by weight or less of at least one other cationically polymerizable monomer which is copolymerizable with isobutylene.

The other cationically polymerizable monomer copolymerizable with isobutylene includes $C_3-C_{12}$ olefins, conjugated dienes, vinyl ethers, aromatic vinyl compounds, vinylsilanes, and the like. Among them, the $C_3-C_{12}$ olefins and conjugated dienes are preferred. In view of weather resistance of the polymer, the olefins other than the conjugated dienes are preferred.

Specific examples of the other cationically polymerizable monomers copolymerizable with isobutylene are propylene, 1-butene, 2-butene, 2-methyl-1-butene, 3-methyl-2-butene, pentene, 4-methyl-1-pentene, hexene, vinylcyclohexane, butadiene, isoprene, cyclopentadiene, methylvinylether, ethylvinylether, isobutylvinylether, styrene, α-methylstyrene, dimethylstyrene, monochlorostyrene, dichlorostyrene, β-pinene, indene, vinyltrichlorosilane, vinylmethyldichlorosilane, vinyldimethylchlorosilane, vinyldimethylmethoxysilane, vinyltrimethylsilane, divinyldichlorosilane, divinyldimethoxysilane, divinyldimethylsilane, 1,3-divinyl-1,1,3,3-tetramethyldisiloxane, trivinylmethylsilane, tetravinylsilane, γ-methacryloyloxypropyltrimethoxysilane, γ-methacryoyloxypropylmethyldimethoxysilane, and the like. Among them, propylene, 1-butene, 2-butene, styrene, butadiene, isoprene and cyclopentadiene are preferred. They may be used independently or as a mixture of two or more of them.

The non-conjugated diene to be used in the present invention is a diene of the formula:

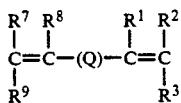 (II)

wherein $R^1$, $R^2$ and $R^3$ are the same as defined above, and $R^7$, $R^8$ and $R^9$ are the same or different and each a hydrogen atom, a methyl group or an ethyl group.

As the non-conjugated diene, any of the compounds of the formula (II) can be used. Examples of the non-conjugated diene are 1,4-pentadiene, 1,5-hexadiene, 1,6-heptadiene, 1,7-octadiene, 1,8-nonadiene, 1,9-decadiene, 1,19-dodecadiene, 2-methyl-2,7-octadiene, 2,6-dimethyl-1,5-heptadiene, 1,5,9-decatriene, and the like. Among them, α,ω-dienes such as 1,4-pentadiene, 1,5-hexadiene, 1,6-heptadiene, 1,7-octadiene, 1,8-nonadiene, 1,9-decadiene and 1,19-dodecadiene are preferred in view of activity of the functional groups contained in the prepared polymer.

The Lewis acid is used as a polymerization catalyst in the process 1 and as a polymerization catalyst and also as a reactant in the process 2 and includes a compound of the formula:

$$MX'_p$$

wherein M is a metal atom, X' is a halogen atom, and p is a valency of the metal M (e.g. $AlCl_3$, $SnCl_4$, $TiCl_4$, $VCl_5$, $FeCl_3$, $BF_3$, etc.) and organic aluminum compounds (e.g. $(C_2H_5)_2AlCl$, $C_2H_5AlCl_2$, etc.). Among them, $SnCl_4$, $TiCl_4$, $(C_2H_5)_2AlCl$ and $C_2H_5AlCl_2$ are preferred.

In the process 1, an amount of the Lewis acid is from 0.1 to 10 times, more preferably from 0.2 to 5 times the weight of the non-conjugated diene to be polymerized with isobutylene.

In the process 2, an amount of the Lewis acid is from 0.001 to 0.1 time the weight of isobutylene, and 0.01 to 5 times the weight of the non-conjugated diene.

In either of the processes 1 and 2, a polymerization initiator is preferably present in a polymerization system. As the polymerization initiator, water contained in the system in a trace amount is effectively used. In addition, a polymerization initiating and chain transfer agent is preferably used.

An example of the polymerization initiating and chain transfer agent is an organic compound of the formula:

 (III)

wherein X is a halogen atom or a group of the formula: RCOO— or RO— in which R is a monovalent organic group, $R^4$, and $R^5$ are the same or different and each a hydrogen atom or a substituted or unsubstituted monovalent hydrocarbon group, and $R^6$ is a polyvalent aromatic group or a substituted or unsubstituted polyvalent hydrocarbon group, provided that when $R^6$ is a polyvalent hydrocarbon group, at least one of $R^4$ and $R^5$ is not a hydrogen atom. More concretely, the organic compound (III) includes a compound of the formula:

$$AY_n \quad (IV)$$

wherein A is a group having 1 to 4 aromatic groups, Y is a group of the formula:

 (V)

in which X is the same as defined above, $R^{10}$ and $R^{11}$ are the same and different and each a hydrogen atom or a $C_1-C_{20}$ monovalent hydrocarbon group and is bonded to an aromatic group, and n is an integer of 1 to 6; a compound of the formula:

$$BZ_m \quad (VI)$$

wherein B is a $C_4$ to $C_{40}$ hydrocarbon group, Z is a halogen atom or a group of the formula: RCOO— or RO— in which R is the same as defined above and is bonded to a tertiary carbon atom, and m is an integer of 1 to 4; and an oligomer comprising α-halostyrene units. These compounds may be used independently or as a mixture of two or more of them.

In the formula (IV), the group A having 1 to 4 aromatic groups may be a group formed through a condensation reaction or a non-condensation type group. Specific examples of the group having the aromatic group(s) are a mono- to hexa-valent phenyl group, a biphenyl group, a naphthalene group, an anthracene group, a phenanthrene group, a pyrene group and a group of the formula: Ph-(CH$_2$)$_l$-Ph in which Ph is a phenyl group and is an integer of 1 to 10. The group having the aromatic group(s) may be substituted with a $C_1$-$C_{20}$ straight or branched aliphatic hydrocarbon group, or a group having a functional group such as a hydroxyl group, an ether group or a vinyl group.

In the compound (VI), Z may be a halogen atom (e.g. F, Cl, Br and I), or the RCOO— or RO— group, which is bonded to a tertiary carbon atom, and B may be a $C_4$ to $C_{40}$ hydrocarbon group, preferably an aliphatic hydrocarbon group. When the number of carbon atoms in the group B is smaller than 4, a carbon atom to which the halogen atom or the RCOO— or RO— group is bonded is not a tertiary carbon atom, so that polymerization difficultly proceeds.

Examples of the oligomer comprising the α-halostyrene units as a polymerization initiating and chain transfer agent are an oligomer of α-chlorostyrene and an oligomer prepared by copolymerizing α-chlorostyrene and a monomer copolymerizable therewith.

As the polymerization initiating and chain transfer agent, the compound (II) having at least groups selected from the group consisting of halogen atoms, RCOO— groups or RO— groups or the compound (II) having at least one group selected from the group consisting of halogen atoms, RCOO— groups or RO— groups and at least one other reactive functional group is effective since the number of functional groups in the produced polymer is increased.

Specific examples of the polymerization initiating and chain transfer agent are:

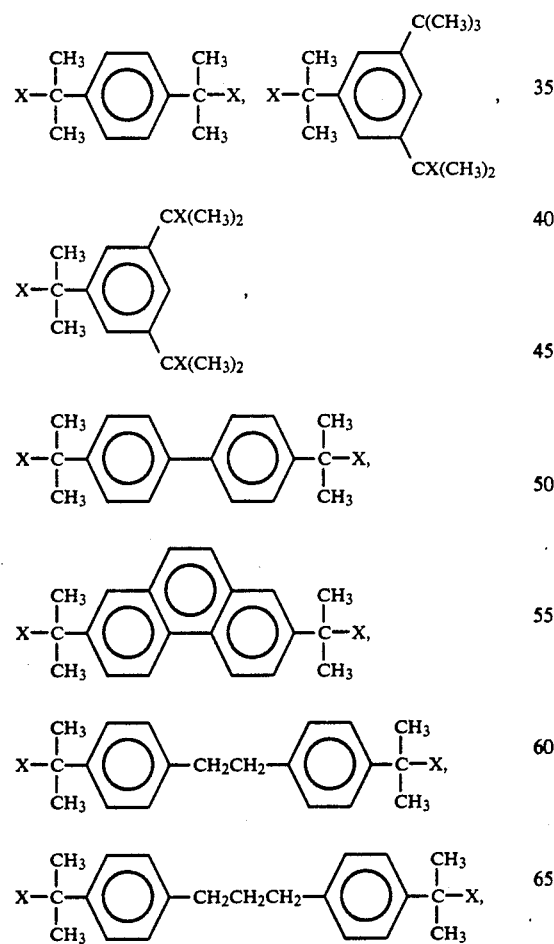

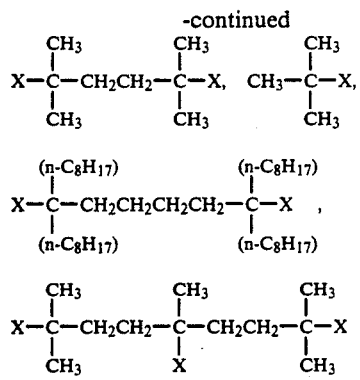

wherein X is the same as defined above; halogen atom-containing organic compounds such as oligomers of α-chlorostyrene and organic compounds having the RCOO— group. Among them, are preferred halogen atom-containing organic compounds having a group: —C(CH$_3$)$_2$Cl or —C(CH$_3$)$_2$Br which easily liberates a stable carbon cation such as

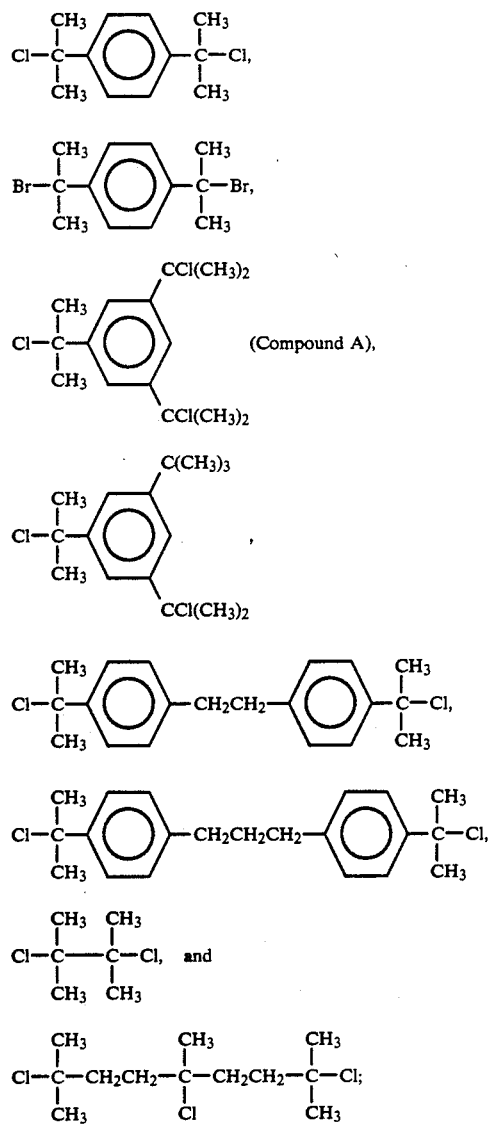

organic compounds having a CH₃COO— group such as

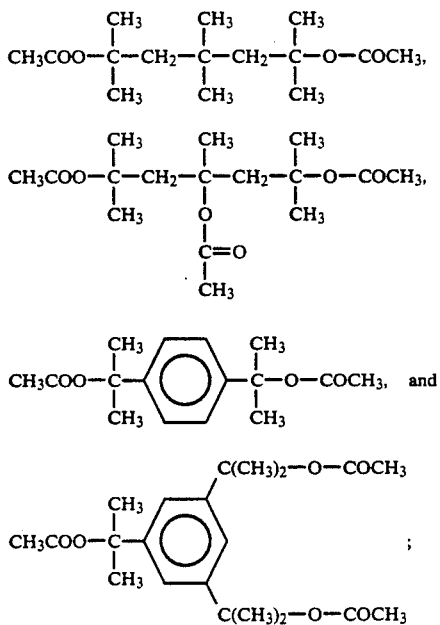

and organic compounds having a CH₃O— group such as

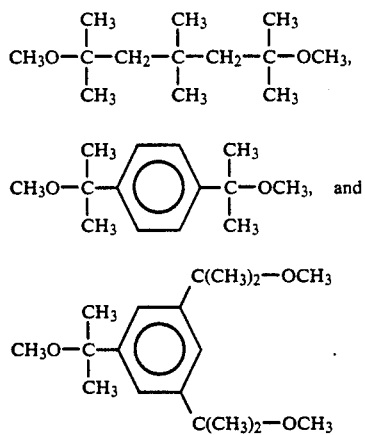

The above compounds may be used independently or as a mixture of two or more of them.

A molecular weight of the produced polymer can be adjusted by controlling an amount of the above polymerization initiating and chain transfer agent or residual water in the polymerization system. In general, the polymerization initiating and chain transfer agent is used in an amount of from 0.01 to 20% by weight, preferably from 0.1 to 10% by weight based on the weight of the cationically polymerizable monomer containing isobutylene.

In the present invention, as a polymerization medium in the process 1 or as a polymerization and reaction medium in the process 2, a hydrocarbon solvent such as an aliphatic hydrocarbon or a halogenated hydrocarbon may be used. Among them, the halogenated hydrocarbon, in particular, chlorinated hydrocarbon is preferred. Specific examples of the aliphatic hydrocarbon are pentane and hexane, and specific examples of the halogenated hydrocarbon are chloromethane, chloroethane, methylene chloride, 1,1-di-chloroethane, chloroform and 1,2-dichloroethane. They may be used independently or as a mixture of two or more of them. In addition, a small amount of other solvent such as an acetate (e.g. ethyl acetate) or an organic compound having a nitro group (e.g. nitroethane) may be used.

There is no specific limitation on procedures for carrying out the process of the present invention, and any of conventional polymerization methods can be used. For example, the process 1 can be carried out by a batchwise method in which the polymerization solvent, the monomer(s), the non-conjugated diene, the catalyst and optionally the polymerization initiating and chain transfer agent are successively charged into a reactor, or a continuous method in which the polymerization solvent, the monomer, the non-conjugated diene, the catalyst and optionally the polymerization initiating and chain transfer agent are continuously supplied to proceed the polymerization and removing the resulting polymer continuously.

Also, the process 2 can be carried out batchwise or continuously as in the case of the process 1 except that the non-conjugated diene is reacted after polymerization.

In the processes 1 and 2 of the present invention, a polymerization temperature is usually from +10 to −80° C., preferably from 0 to −40° C. A polymerization time is usually from 0.5 to 120 minutes, preferably from 1 to 60 minutes. A monomer concentration is usually from 0.1 to 8 mole/liter, preferably from 0.5 to 5 mole/liter.

In the process 2, a reaction time after the supply of the non-conjugated diene is preferably from 10 to 300 minutes.

In the process 1, an amount of the non-conjugated diene which is supplied before the polymerization reaction of the cationically polymerizable monomer containing isobutylene is from 0.01 to 1 mole per one mole of the isobutylene monomer, and the supplied non-conjugated diene is uniformly distributed in the polymerization system by stirring. In the process 2, an amount of the non-conjugated diene which is supplied after the polymerization is from 0.01 to 1 mole per one mole of the isobutylene monomer, and the added diene is uniformly distributed in the reaction system by stirring.

In the process 1, the polymerization reaction is terminated preferably by the addition of an alcohol such as methanol in view of easiness of post-treatment. In the process 2, the reaction after the addition of the non-conjugated diene is stopped preferably by the addition of the alcohol. The polymerization reaction in the process 1 or the reaction in the process 2 may be stopped by any of other conventional methods, or may not be stopped in some cases.

By the above processes 1 and 2, the isobutylene polymer comprising more than one unit (I) per molecule on the average and having a number average molecular weight of 500 to 500,000 is produced. By the process 2, one or several units (I) may be introduced at the molecular ends.

In the isobutylene polymers prepared by the processes 1 and 2, substantially the same number of the functional groups are introduced when the amounts of the raw materials are substantially the same as seen from the results of Examples described below. Then, by the process 1, the units (I) may be introduced at the molecular ends.

The novel isobutylene polymer of the present invention can be easily prepared as described above at a low cost.

Since the polymer of the present invention is prepared using no conjugated diene, it has no olefinically unsaturated bond which may be formed through 1,4-addition, so that the polymer has good weather resistance or other properties.

The isobutylene polymer of the present invention can be used as a cross-linkable material as such. In addition, the functional groups in the polymer can be converted to other groups such as a hydroxyl group, an amino group, an alkoxysillyl group, a hydrogensillyl group, and the like.

By the process for preparing the isobutylene polymer of the present invention, more than one unsaturated groups on the average are easily introduced in the polymer.

PREFERRED EMBODIMENTS OF THE INVENTION

The present invention will be illustrated by the following Examples.

EXAMPLE 1

A 100 ml pressure-proof glass autoclave, which was equipped with an agitating blade and a three-way stop cock and connected to a vacuum line, was dried by heating it at 100° C. for 1 hour while evacuating it through the vacuum line. After cooling down to room temperature, nitrogen gas was introduced in the autoclave up to an atmospheric pressure through the three-way stop cock.

Methylene chloride (40 ml) which had been dried over calcium hydride as a main solvent was introduced with an injector while flowing the nitrogen gas from the three-way stop cock. Thereafter, distilled and purified 1,9-decadiene (20 mmol) was added and then a solution (10 ml) of tricumyl chloride (TCC: above Compound A) (3 mmol) dissolved in methylene chloride was added.

To the three-way stop cock, a glass made liquefied gas collector having a needle valve, isobutylene (7 g), which had been dried by passing it through a column filled with barium oxide, was charged, and the collector was connected to the three-way stop cock. The main part of the autoclave was dipped in a dry ice/acetone bath at −70° C. for 1 hour while stirring the content in the autoclave. Thereafter, the autoclave interior was evacuated to reduced pressure through the vacuum line, and the needle valve was opened to introduce isobutylene from the collector to the autoclave. Then, the interior pressure of the autoclave was increased to the atmospheric pressure by introducing the nitrogen gas through the three-way stop cock, and the autoclave content was cooled for 1 hour while stirring, during which the autoclave temperature rose to −30° C.

Then, $TiCl_4$ (3.2 g, 10 mmol) was added through the three-way stop cock to initiate polymerization. After 60 minutes, methanol, which had been cooled to lower than 0° C., was added to terminate the reaction.

The reaction mixture was poured in a flask, and unreacted isobutylene, methylene chloride, 1,9-decadiene and methanol were evaporated off. The residual polymer was dissolved in n-hexane (100 ml), and the solution was washed with water till washing water became neutral. Thereafter, the n-hexane solution was concentrated to 20 ml and poured in acetone (300 ml) to precipitate the polymer.

The polymer was redissolved in n-hexane (100 ml) and dried over anhydrous magnesium sulfate. After filtration, n-hexane was evaporated off under reduced pressure to obtain an isobutylene polymer.

Figure 2:
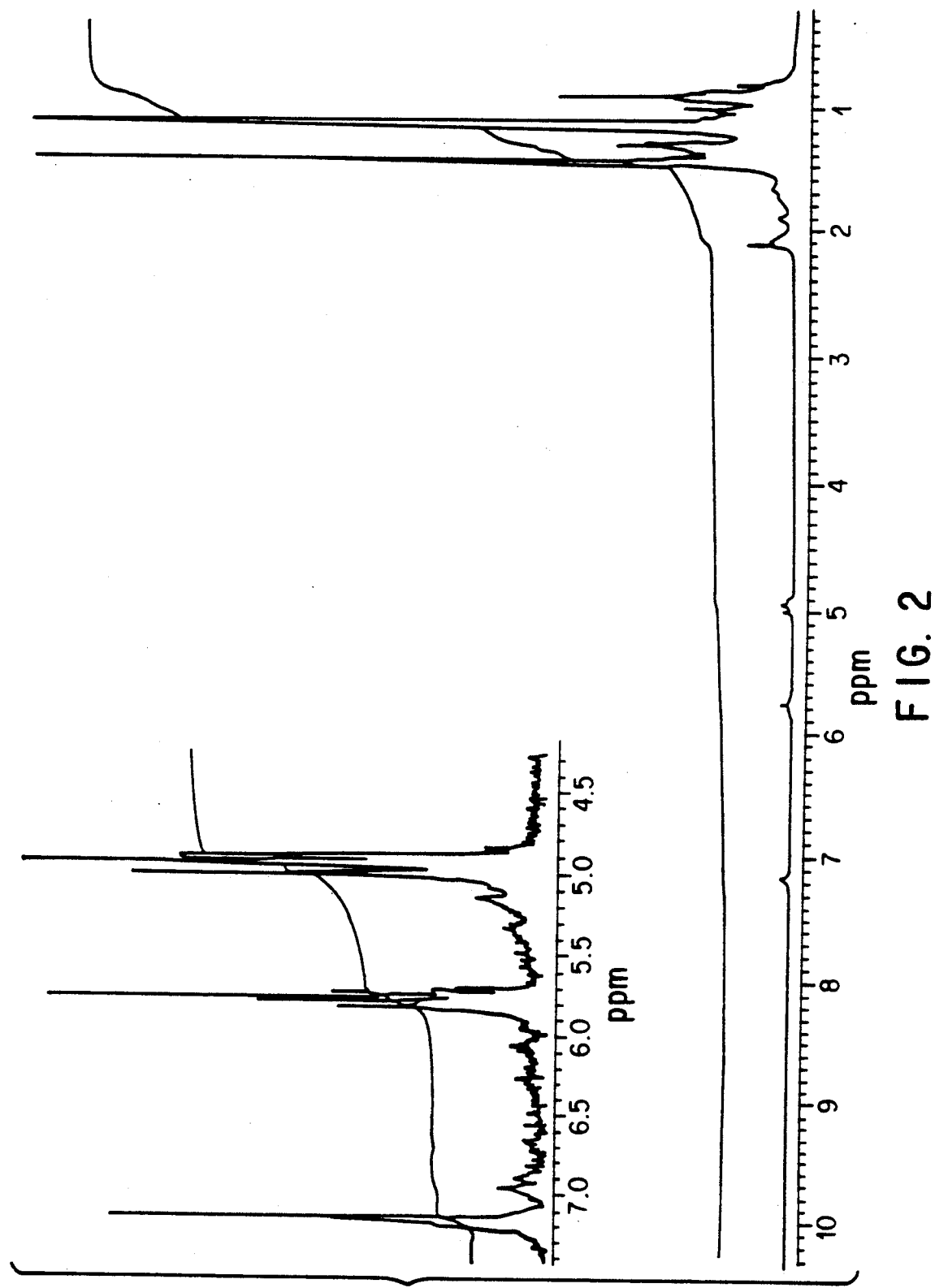

An yield of the polymer was calculated from a polymer weight, Mn and Mw/Mn were measured by GPC, and a terminal structure of the polymer was defined by measuring $^1$H-NMR (300 MHz) of the polymer see FIG. 2) and comparing strengths of resonance signals of protons assigned to respective structures. The results are shown in Table 2.

The IR spectrum of the obtained polymer is shown in FIG. 1.

EXAMPLES 2 to 7

In the same manner as in Example 1 but changing the polymerization conditions such as the use of the polymerization initiating and chain transfer agent and/or the kind and amount of the polymerization catalyst as shown in Table 1, a polymer was prepared and analyzed. The results are shown in Table 2.

COMPARATIVE EXAMPLE 1

In the same manner as in Example 1 but using no non-conjugated diene, a polymer was prepared and analyzed. The results are shown in Table 2.

TABLE 1

| Example No. | polymerization initiating and chain transfer agent | | Polymerization catalyst | Non-conjugated diene | |
|---|---|---|---|---|---|
| | Kind | Amount (mmol) | | Kind | Amount (mmol) |
| 1 | TCC | 3 | $TiCl_4$ | 1,9-Decadiene | 20 |
| 2 | TCC | 3 | $TiCl_4$ | 1,9-Decadiene | 10 |
| 3 | TCC | 3 | $TiCl_4$ | 1,9-Decadiene | 5 |
| 4 | TCC | 3 | $SnCl_4$ | 1,9-Decadiene | 20 |
| 5 | TCC | 3 | $TiCl_4$ | 2-Methyl-2,7-octadiene | 20 |
| 6 | — | — | $TiCl_4$ | 1,9-Decadiene | 20 |
| 7 | — | — | $TiCl_4$ | 1,5-Hexadiene | 20 |
| Com. 1 | TCC | 3 | $TiCl_4$ | — | — |

TABLE 2

| Example No. | Yield (%) | No. Av. Molecular weight | Molecular weight distribution | Number of functional groups* | | |
|---|---|---|---|---|---|---|
| | | | | $-CH=CH_2$ | $-CH=C(CH_3)_2$ | $-C(CH_3)_2Cl$ |
| 1 | 90 | 5800 | 2.40 | 4.7 | 0.1 | — |
| 2 | 95 | 7800 | 2.75 | 3.6 | 0.1 | — |
| 3 | 95 | 6700 | 2.80 | 2.4 | 0.1 | — |
| 4 | 92 | 6500 | 2.60 | 6.1 | 0.2 | — |
| 5 | 95 | 5300 | 2.10 | 0 | 4.8 | — |
| 6 | 94 | 9600 | 3.10 | 4.2 | 0.3 | — |
| 7 | 90 | 7600 | 2.95 | 3.5 | 0.2 | — |

TABLE 2-continued

| Example No. | Yield (%) | No. Av. Molecular weight | Molecular weight distribution | Number of functional groups* | | |
|---|---|---|---|---|---|---|
| | | | | —CH=CH$_2$ | —CH=C(CH$_3$)$_2$ | —C(CH$_3$)$_2$Cl |
| Com. 1 | 95 | 5100 | 3.05 | 0 | 0.4 | 2.0 |

Note:
*The number of the functional groups per one molecule.

EXAMPLE 8

A 100 ml pressure-proof glass autoclave, which was equipped with an agitation blade and a three-way stop cock and connected to a vacuum line, was dried by heating it at 100° C. for 1 hour while evacuating it through the vacuum line. After cooling down to room temperature, nitrogen gas was introduced in the autoclave up to an atmospheric pressure through the three-way stop cock.

Methylene chloride (40 ml) which had been dried over calcium hydride as a main solvent was introduced with an injector while flowing the nitrogen gas from the three-way stop cock. Thereafter, a solution (10 ml) of tricumyl chloride (TCC: above Compound A) (3 mmol) dissolved in methylene chloride was added.

To the three-way stop cock, a glass made liquefied gas collector having a needle valve, isobutylene (7 g), which had been dried by passing it through a column filled with barium oxide, was charged, and the collector was connected to the three-way stop cock. The main part of the autoclave was dipped in a dry ice/acetone bath at −70° C. for 1 hour while stirring the content in the autoclave. Thereafter, the autoclave interior was evacuated to reduced pressure through the vacuum line, and the needle valve was opened to introduce isobutylene from the collector to the autoclave. Then, the interior pressure of the autoclave was increased to the atmospheric pressure by introducing the nitrogen gas through the three-way stop cock, and the autoclave content was cooled for 1 hour while stirring, during which the autoclave temperature rose to −30° C. Then, TiCl$_4$ (3.2 g, 10 mmol) was added through the three-way stop cock to initiate polymerization. After 60 minutes, distilled and purified 1,9-decadiene (20 mmol) was added and the reaction was continued at −30° C. for 60 minutes. Thereafter, methanol, which had been cooled to lower than 0° C., was added to terminate the reaction.

The reaction mixture was poured in a flask, and unreacted isobutylene, methylene chloride, 1,9-decadiene and methanol were evaporated off. The residual polymer was dissolved in n-hexane (100 ml), and the solution was washed with water till washing water became neutral. Thereafter, the n-hexane solution was concentrated to 20 ml and poured in acetone (300 ml) to precipitate the polymer.

The polymer was redissolved in n-hexane (100 ml) and dried over anhydrous magnesium sulfate. After filtration, n-hexane was evaporated off under reduced pressure to obtain an isobutylene polymer.

Figure 4:
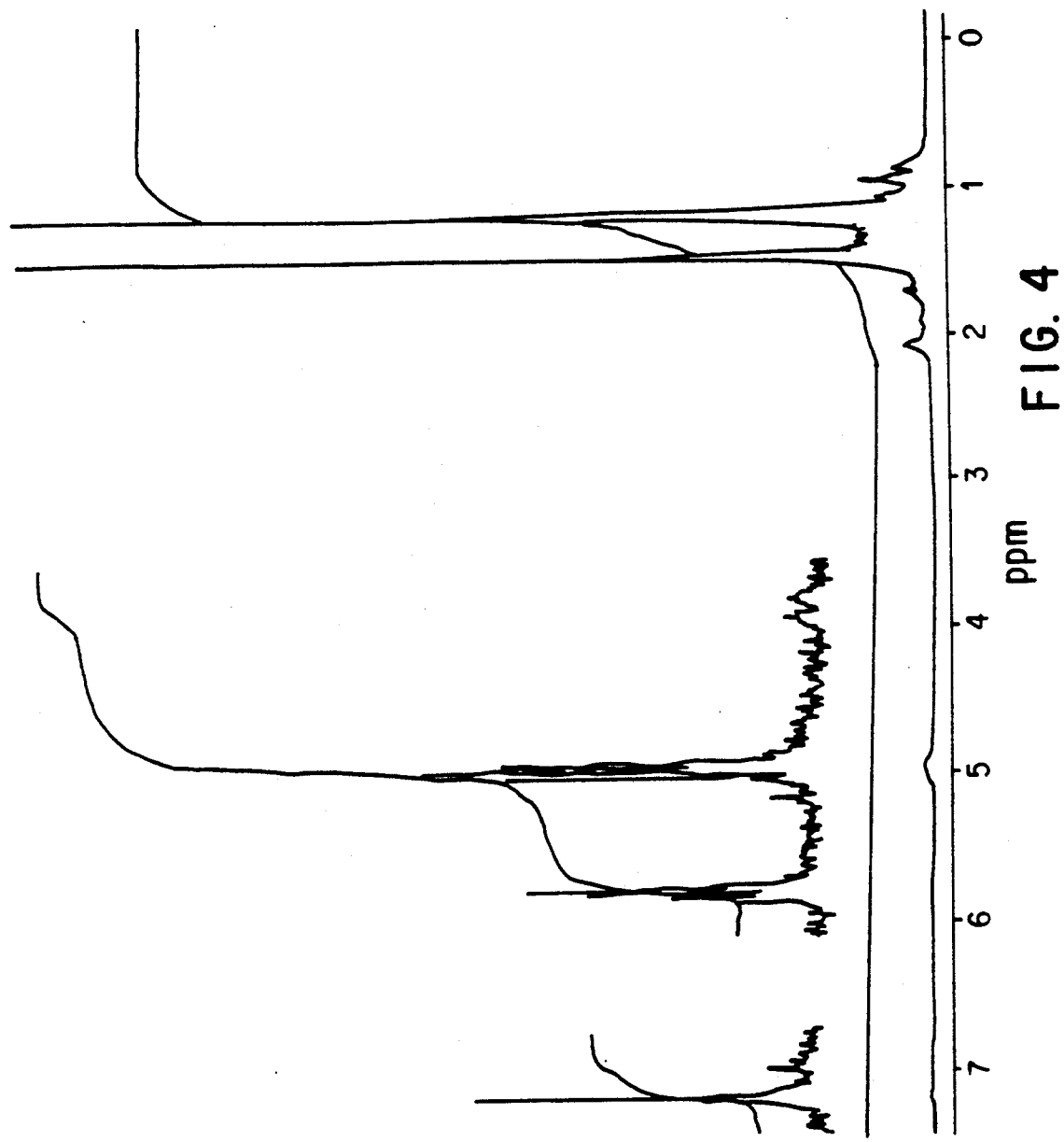

An yield of the polymer was calculated from a polymer weight, Mn and Mw/Mn were measured by GPC, and a terminal structure of the polymer was defined by measuring $^1$H-NMR (300 MHz) of the polymer (see FIG. 4) and comparing strengths of resonance signals of protons assigned to respective structures. The results are shown in Table 4.

Figure 3:
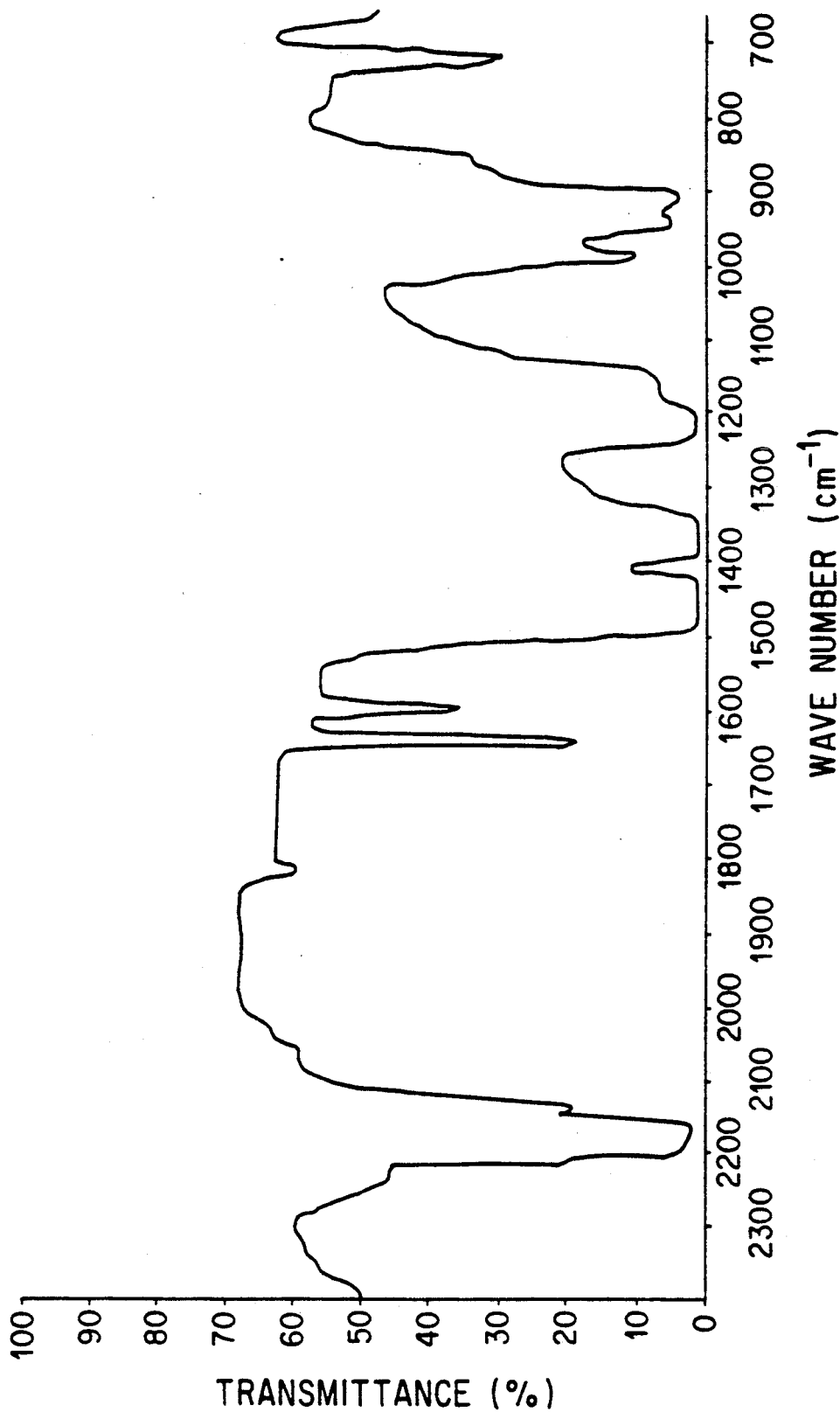
FIGS. 3 and 4 are the IR spectrum and the $^1$H-NMR spectrum of the polymer prepared in Example 8, respectively.

The IR spectrum of the obtained polymer is shown in FIG. 3.

EXAMPLES 9 to 14

In the same manner as in Example 1 but changing the polymerization conditions such as the use of the polymerization initiating and chain transfer agent and/or the kind and amount of the polymerization catalyst as shown in Table 3, a polymer was prepared and analyzed. The results are shown in Table 4.

COMPARATIVE EXAMPLE 2

In the same manner as in Example 8 but using no non-conjugated diene, a polymer was prepared and analyzed. The results are shown in Table 2.

EXAMPLE 15

The isolated and purified polyisobutylene having tertiary chlorinated terminals obtained in Comparative Example 2 (5 g) was dissolved in methylene chloride (40 ml) which had been dried over calcium hydride. To the solution, 1,9-decadiene (20 mmol) was added. After cooling down to −30° C., TiCl$_4$ (5 mmol) was added to the solution and stirring was continued for 60 minutes. After terminating the reaction, the polymer was purified and analyzed as in Example 8. The results are also shown in Table 4.

TABLE 3

| Example No. | polymerization initiating and chain transfer agent | | Polymerization catalyst | Non-conjugated diene | |
|---|---|---|---|---|---|
| | Kind | Amount (mmol) | | Kind | Amount (mmol) |
| 8 | TCC | 3 | TiCl$_4$ | 1,9-Decadiene | 20 |
| 9 | TCC | 3 | TiCl$_4$ | 1,9-Decadiene | 10 |
| 10 | TCC | 3 | TiCl$_4$ | 1,9-Decadiene | 5 |
| 11 | TCC | 3 | SnCl$_4$ | 1,9-Decadiene | 20 |
| 12 | TCC | 3 | TiCl$_4$ | 2-Methyl-2,7-octadiene | 20 |
| 13 | — | — | TiCl$_4$ | 1,9-Decadiene | 20 |
| 14 | — | — | TiCl$_4$ | 1,5-Hexadiene | 20 |
| Com. 2 | TCC | 3 | TiCl$_4$ | — | — |
| 15 | TCC | 3 | TiCl$_4$ | 1,9-Decadiene | 20 |

TABLE 4

| Example No. | Yield (%) | No. Av. Molecular weight | Molecular weight distribution | Number of functional groups* | | |
|---|---|---|---|---|---|---|
| | | | | —CH=CH$_2$ | —CH=C(CH$_3$)$_2$ | —C(CH$_3$)$_2$Cl |
| 8 | 92 | 6500 | 2.65 | 4.1 | 0.1 | — |
| 9 | 90 | 5700 | 2.45 | 3.4 | 0.2 | — |

TABLE 4-continued

| Example No. | Yield (%) | No. Av. Molecular weight | Molecular weight distribution | Number of functional groups* | | |
|---|---|---|---|---|---|---|
| | | | | —CH=CH$_2$ | —CH=C(CH$_3$)$_2$ | —C(CH$_3$)$_2$Cl |
| 10 | 92 | 6600 | 2.90 | 2.5 | 0.1 | — |
| 11 | 95 | 5600 | 2.55 | 4.6 | 0.1 | — |
| 12 | 90 | 6500 | 2.40 | 0 | 4.2 | — |
| 13 | 92 | 5900 | 3.20 | 4.0 | 0.2 | — |
| 14 | 95 | 6700 | 2.80 | 3.2 | 0.1 | — |
| Com. 1 | 95 | 5100 | 3.05 | 0 | 0.4 | 2.0 |
| 15 | 99 | 5200 | 3.08 | 2.8 | 0.1 | — |

Note:
The number of the functional groups per one molecule.

What is claimed is:

1. An isobutylene polymer having an unsaturated group at a polymer chain end and comprising 1.1 to 5 units per molecule on the average of the formula:

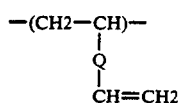   (I)

wherein Q is a C$_1$–C$_{30}$ divalent organic group.

2. The isobutylene polymer according to claim 1, which has a number average molecular weight of from 500 to 500,000.

3. The isobutylene polymer according to claim 1, which has substantially no unsaturated group in polymer chains.

4. The isobutylene polymer according to claim 1, which is the reaction product of a cationically polymerizable monomer selected from the group consisting of pure isobutylene and mixtures of 50% by weight or more of isobutylene and 50% by weight or less of at least one other cationically polymerizable monomer which is copolymerizable with isobutylene and a non-conjugated diene.

5. The isobutylene polymer according to claim 1, which is the reaction product of a cationically polymerizable monomer and a non-conjugated diene of the formula:

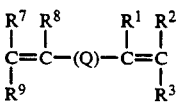   (II)

wherein Q, R$^1$, R$^2$ and R$^3$ are the same as defined above, and R$^7$, R$^8$ and R$^9$ are the same or different and each a hydrogen atom, a methyl group or an ethyl group.

* * * * *